(12) United States Patent
Masuda et al.

(10) Patent No.: US 12,192,874 B2
(45) Date of Patent: Jan. 7, 2025

(54) NODE, COMMUNICATION SYSTEM, AND COMMUNICATION METHOD

(71) Applicant: DAIKIN INDUSTRIES, LTD., Osaka (JP)

(72) Inventors: Yoshiyuki Masuda, Osaka (JP); Chang Wenn Tok, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 344 days.

(21) Appl. No.: 17/702,690

(22) Filed: Mar. 23, 2022

(65) Prior Publication Data

US 2022/0217609 A1 Jul. 7, 2022

Related U.S. Application Data

(63) Continuation of application No. PCT/JP2020/036978, filed on Sep. 29, 2020.

(30) Foreign Application Priority Data

Sep. 30, 2019 (JP) ................... 2019-180830

(51) Int. Cl.
*H04W 40/02* (2009.01)
*H04W 84/20* (2009.01)

(52) U.S. Cl.
CPC ............ *H04W 40/02* (2013.01); *H04W 84/20* (2013.01)

(58) Field of Classification Search
CPC .............................. H04W 40/02; H04W 84/20
USPC ........ 370/315, 328, 329, 338, 341, 345, 350
See application file for complete search history.

(56) References Cited

U.S. PATENT DOCUMENTS

| 2008/0186898 A1* | 8/2008 | Petite | H04W 40/00 370/315 |
|---|---|---|---|
| 2012/0082065 A1 | 4/2012 | Yanagihara et al. | |
| 2013/0070671 A1 | 3/2013 | Ezure et al. | |
| 2017/0005936 A1 | 1/2017 | Aoki et al. | |

(Continued)

FOREIGN PATENT DOCUMENTS

| JP | 2003244210 A * | 8/2003 |
|---|---|---|
| JP | 2007-96917 A | 4/2007 |
| JP | 2017-17682 A | 1/2017 |

(Continued)

OTHER PUBLICATIONS

International Search Report of corresponding PCT Application No. PCT/JP2020/036978 dated Nov. 24, 2020.

(Continued)

*Primary Examiner* — Nghi H Ly
(74) *Attorney, Agent, or Firm* — Global IP Counselors, LLP

(57) ABSTRACT

A node performs multi-hop communication. The node includes a relay node determiner that determines a relay node from a plurality of relay node candidates having path information of a path to a master node. The relay node performs relaying. At least when communication frequencies of the relay node candidates are within a predetermined range, the relay node determiner determines the relay node so that a relay node candidate with a higher communication frequency is more likely to be determined as the relay node than a relay node candidate with a lower communication frequency.

18 Claims, 6 Drawing Sheets

(56) References Cited

U.S. PATENT DOCUMENTS

2017/0374366 A1* 12/2017 Xiu .................. H04N 19/147

FOREIGN PATENT DOCUMENTS

| JP | 2019-22112 A | 2/2019 |
|----|--------------|--------|
| JP | 2019-121907 A | 7/2019 |

OTHER PUBLICATIONS

International Telecommunication Union; ITU-T G. 9905 Amendment 1 (2013); pp. i-iii and 1-32; Nov. 2016, Geneva, Switzerland.
International Preliminary Report of corresponding PCT Application No. PCT/JP2020/036978 dated Apr. 14, 2022.
European Search Report of corresponding EP Application No. 20 87 0527.7 dated Oct. 20, 2022.

* cited by examiner

NODE, COMMUNICATION SYSTEM, AND COMMUNICATION METHOD

CROSS-REFERENCE TO RELATED APPLICATIONS

This is a continuation of International Application No. PCT/JP2020/036978 filed on Sep. 29, 2020, which claims priority to Japanese Patent Application No. 2019-180830, filed on Sep. 30, 2019. The entire disclosures of these applications are incorporated by reference herein.

TECHNICAL FIELD

The present disclosure relates to a node that performs multi-hop communication, a communication system including a node that performs multi-hop communication, and a communication method for the communication system.

BACKGROUND ART

ITU-T G. 9905 (A non-patent literature) discloses a communication processing method for sending information from an individual node to a destination node in a communication system that performs multi-hop communication. In the communication system disclosed in ITU-T G 9905 (A non-patent literature), if an individual node does not have information of a communication path to a destination node, it selects a communication path requiring the smallest cost to perform communication from this node to a master node and sends information.

SUMMARY

Anode according to a first aspect is a node that performs multi-hop communication. The node includes a relay node determiner configured to determine a relay node from a plurality of relay node candidates having path information of a path to a master node. The relay node is configured to perform relaying. At least when communication frequencies of the relay node candidates are within a predetermined range, the relay node determiner is configured to determine the relay node so that a relay node candidate with a higher communication frequency is more likely to be determined as the relay node than a relay node candidate with a lower communication frequency.

DETAILED DESCRIPTION OF EMBODIMENT(S)

(1) Overview of Communication Processing in Known Communication System 200

Figure 1:
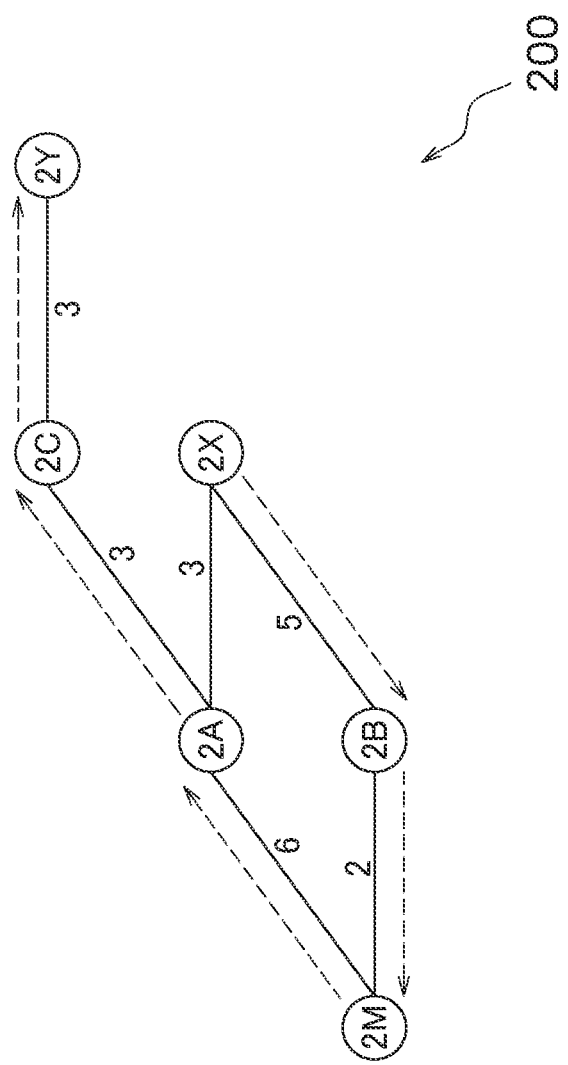
FIG. 1 is a diagram illustrating a known communication system.

FIG. 1 is a schematic view of a known communication system 200 including plural nodes 2. The nodes 2 are not restricted to a particular type, but they are at least communication devices that perform communication by using a multi-hop routing program. For the sake of description, the plural nodes 2 are each appended with one of letters M, A, B, C, X, and Y so as to be distinguished from each other. Hereinafter, an overview of communication processing for sending information from the node 2X to the node 2Y in the known communication system 200 will be described below.

Among the plural nodes 2M, 2A, 2B, 2C, 2X, and 2Y shown in FIG. 1, the node 2M is a master node. The nodes 2A, 2B, 2C, 2X, and 2Y other than the node 2M are slave nodes. In FIG. 1, the lines connecting the nodes 2M, 2A, 2B, 2C, 2X, and 2Y each indicate a communication path through which communication can be performed with one hop. It is assumed that, in the communication system 200, each of the plural nodes 2A, 2B, 2C, 2X, and 2Y, which are slave nodes, has already established a communication path to the node 2M. Processing for establishing a communication path will be discussed later when the communication system 100 is discussed.

The nodes 2A, 2B, 2C, 2X, and 2Y having established a communication path each store information about the established communication path as path information of its own node. The path information includes information on the address of the master node, the address of a relay node which serves to perform relaying to the master node, the number of hops until the master node, the communication cost required until the master node, etc. In the present disclosure, the communication cost indicates a value of the communication quality between nodes. As the communication cost is smaller, the communication quality between nodes is higher. The communication cost is a value which is set based on the communication strength, for example, between nodes. It is preferable that each node execute communication processing to minimize the communication cost. The communication cost between nodes is represented by the number indicated near the line connecting these nodes, as shown in FIG. 1. For example, the communication cost between the node 2M and the node 2A is 6.

In the following description of the present disclosure, a node having a smaller number of hops from the master node in the communication path is assumed to be a higher node, while a node having a greater number of hops from the master node in the communication path is assumed to be a lower node. It is assumed that the master node stores all items of path information of the slave nodes of the master node and that a slave node stores all items of path information of the lower nodes of this slave node. More specifically, in FIG. 1, the node 2M, which is the master node, stores path information of the nodes 2A, 28, 2C, 2X, and 2Y, which are slave nodes, while each of the nodes 2A, 2B, 2C, 2X, and 2Y, which are slave nodes, stores path information of its own node and path information of its lower nodes.

The node 2X is a sending node that stores information to be sent to the node 2Y. The node 2Y is a destination node that receives the information from the node 2X.

Then sending information to the node 2Y, the node 2X first determines whether path information of the node 2X or path information of its lower nodes includes information of the communication path to the node 2Y. In this example, the items of path information stored in the node 2X have no information of the communication path to the node 2Y. The node 2X thus sends the information to the node 2B in accordance with the path information of the node 2X (communication cost 5).

As information of communication paths, the node 2X stores information of the communication path for performing communication with the node 2M via the node 2A and information of the communication path for performing communication with the node 2M via the node 2B. The communication cost of the communication path to the node 2M via the node 2A is 9, while that via the node 2B is 7. The node 2X accordingly selects the information of the communication path for performing communication with the node 2M via the node 2B having a smaller communication cost as path information of the node 2X, and sends the information.

Upon receiving the information from the node 2X, as in the node 2X, the node 2B determines whether the path information stored in the node 2B includes information of the communication path to the node 2Y. The path information stored in the node 2B does not include information of the communication path to the node 2Y and thus sends the information to the node 2M in accordance with the path information of the node 2B (communication cost 2).

The path information stored in the node 2M includes information of the communication path to the node 2Y. The node 2M having received the information from the node 2B thus sends the information to the node 2Y via the node 2A and the node 2C in accordance with the path information of the path to the node 2Y (communication cost 6+3+3).

Communication processing for sending the information from the node 2X to the node 2Y has been completed as described above. The communication cost required for completing this processing is 19.

In the known communication system 200, a sending node selects a node to send information in accordance with whether path information stored in the sending node includes information of the communication path to a destination node. However, if, for example, the node 2X sends information to the node 2A, the information can be sent from the node 2X to the node 2Y via the node 2A and the node 2C, thereby completing communication processing. In this case, the communication cost required for completing the processing is 9. It is thus possible to complete communication processing with a smaller communication cost than that in the above-described known communication system 200.

A communication system 100 according to the present disclosure executes communication processing by using a node 1 having the following characteristics, thereby contributing to decreasing the number of nodes which perform relaying to a destination node and accordingly reducing the communication cost required for completing communication processing.

(2) Configuration of Node 1

Figure 2:
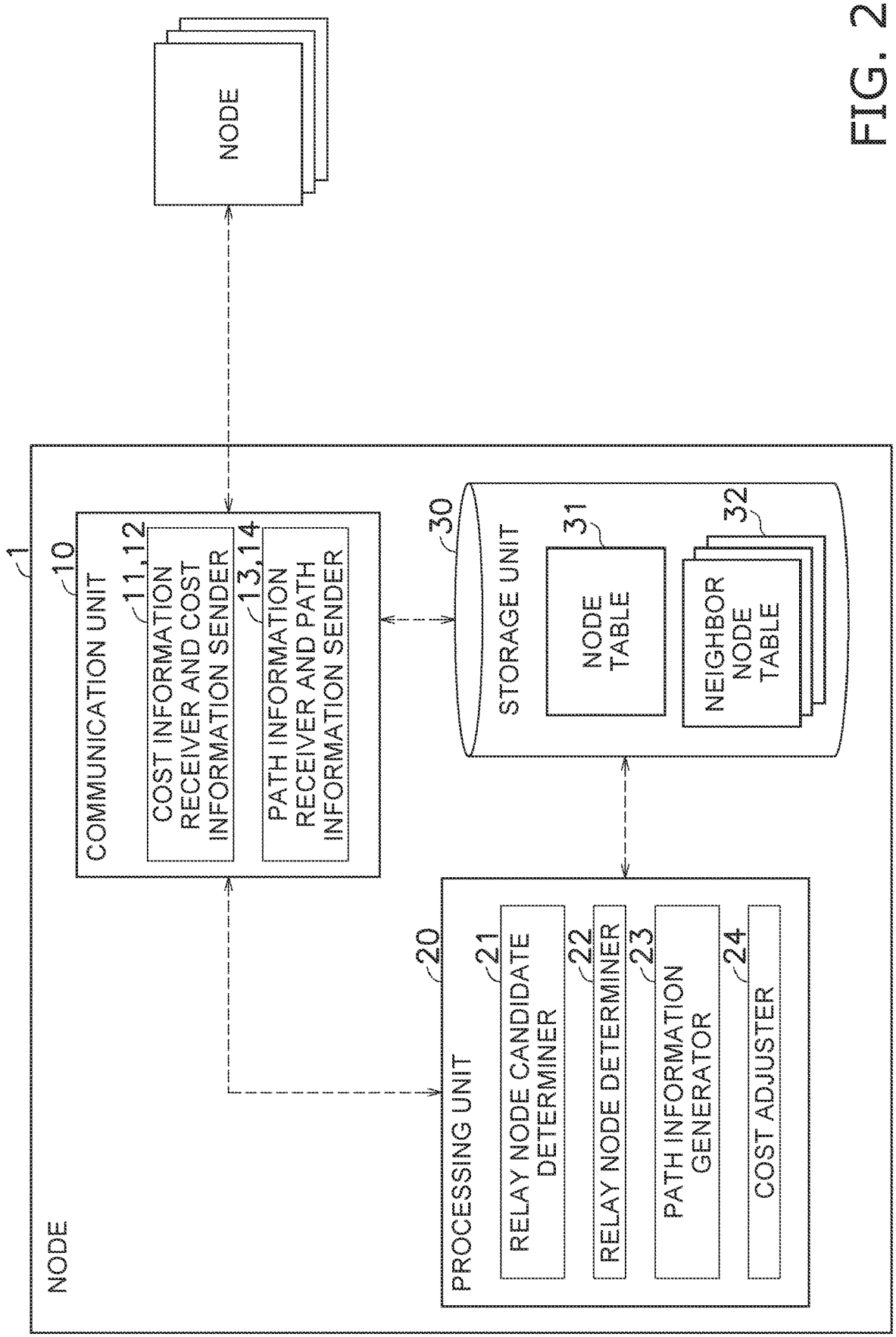
FIG. 2 is a diagram illustrating the configuration of a node.
Figure 3:
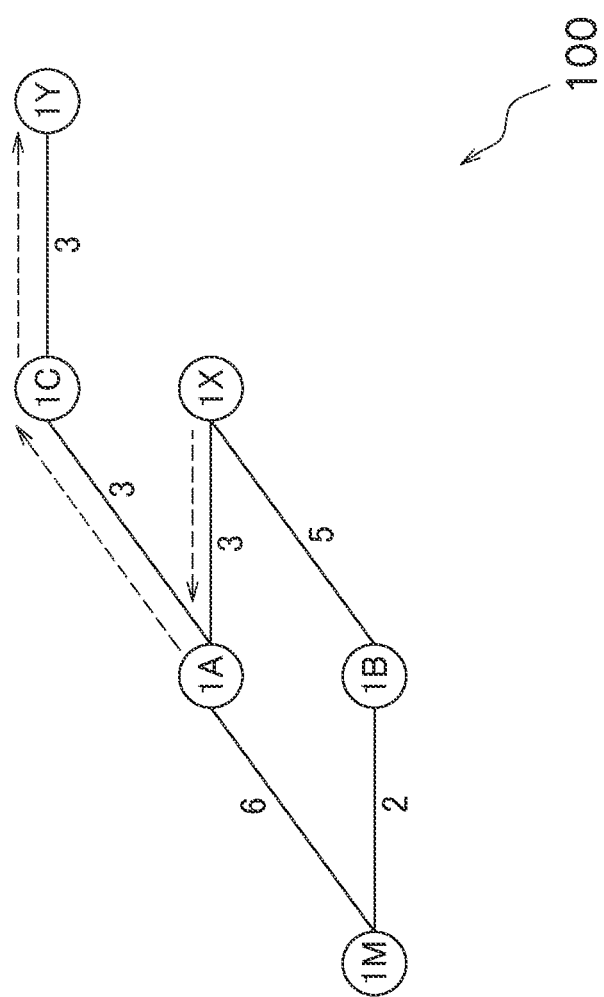
FIG. 3 is a diagram illustrating a communication system.

FIG. 2 is a diagram illustrating the configuration of the node 1 according to the present disclosure. The node 1 is not restricted to a particular type, but it is at least a communication device that performs communication by using a multi-hop routing program. The communication device is an outdoor unit or an indoor unit of an air conditioner, a ventilator, or one of various sensors, for example. FIG. 3 is a schematic diagram of the communication system 100 including plural nodes 1 according to the present disclosure. For the sake of description, the plural nodes 1 shown in FIG. 3 are each appended with one of letters M, A, C, X, and Y. The configurations of nodes 1M, 1A, 1B, 1C, 1X, and 1Y shown in FIG. 3 are the same as that of the node 1. Hence, among the plural nodes 1 having similar function units, for distinguishing one node 1 from the other nodes 1, the node 1 will be described by appending a corresponding one of letters m, a, b, c, x, and y to the function units of the node 1.

The node 1 shown in FIG. 2 includes a communication unit 10, a processing unit 20, and a storage unit 30 as major elements.

(2-1) Communication Unit 10

The node 1 can perform multi-hop wireless communication using a wireless signal with another node in the communication system 100 via the communication unit 10. A wireless signal includes plural items of information. The communication unit 10 can function as cost information communicators 11 and 12 or path information communicators 13 and 14 as a result of performing communication.

If the node 1 has path information of the node 1, which will be discussed later, the communication unit 10 broadcasts a wireless signal at predetermined time intervals so as to search for another node (neighbor node) with which the node 1 can communicate with one hop. The communication unit 10 also receives a wireless signal broadcast from a neighbor node so as to recognize the presence of the neighbor node and to establish a communication path with this neighbor node.

(2-1-1) Cost Information Communicators 11 and 12

The cost information communicators (cost obtainers) 11 and 12 respectively include a cost information receiver 11 that receives information about the communication cost from another node and a cost information sender 12 that sends information about the communication cost to another node.

The communication cost, which indicates the communication quality between nodes in the communication system 100, includes a first cost, a second cost, and a third cost. The first cost is a communication cost from a certain node to a relay node candidate, which will be discussed later. The second cost is a communication cost from a relay node candidate to a master node. The second cost may be a communication cost adjusted by a cost adjuster 24 of another node. The cost adjuster 24 will be discussed later in detail. The third cost is the sum of the first cost and the second cost and is a communication cost from a certain node to the master node.

More specifically, in the communication system 100 shown in FIG. 3, when a relay node candidate of the node 1X is the node 1A, for example, the cost information receiver 11x of the node 1X obtains the communication cost from the node 1A to the node 1M as the second cost. Meanwhile, the cost information sender 12a of the node 1A inputs information about the third cost of the node 1A into a wireless signal and sends this wireless signal. In other words, the third cost of the node 1A, which is a relay node candidate, is obtained by the node 1X as the second cost.

The first cost is calculated as a result of the communication unit 10x of the node 1X and the communication unit 10a of the node 1A exchanging wireless signals.

The first cost and the second cost obtained by the cost information communicators 11 and 12 are stored in a neighbor node table 32 of the storage unit 30, which will be discussed later. The third cost calculated based on the first cost and the second cost is stored in a node table 31 of the storage unit 30.

(2-1-2) Path Information Communicators 13 and 14

The path information communicators 13 and 14 respectively include a path information receiver 13 that receives information about path information from another node and a path information sender 14 that sends information about path information to another node.

The path information is information of a communication path from a certain node to a master node and includes information on the address of the master node, the address of a relay node which serves to perform relaying to the master node, the number of hops until the master node, the communication cost required until the master node, etc.

The path information receiver 13 receives from another node path information of this node and path information of a lower node of this node.

The path information sender 14 sends path information of the node 1 generated by a path information generator 23 of the processing unit 20, which will be discussed later, and path information of a lower node of the node 1 to another node.

(2-2) Processing Unit 20

The processing unit 20 includes function units, such as a relay node candidate determiner 21, a relay node determiner 22, a path information generator 23, and a cost adjuster 24. The processing unit 20 is constituted by an integrated circuit including a central processing unit (CPU), for example. The individual function units are implemented as a result of the processing unit 20 executing a preinstalled computer program, for example. The individual function units will be discussed below.

(2-2-1) Relay Node Candidate Determiner 21

The relay node candidate determiner 21 executes processing for determining a neighbor node as a relay node candidate based on a wireless signal received by the communication unit 10. The relay node candidate is a master node or a node which stores information of the communication path (path information) until the master node, among the nodes with which the node 1 can communicate with one hop.

(2-2-2) Relay Node Determiner 22

The relay node determiner 22 executes processing for determining a relay node which performs relaying, from among the relay node candidates determined by the relay node candidate determiner 21.

If plural relay node candidates are determined by the relay node candidate determiner 21 and at least when the communication frequencies of the relay node candidates are within a predetermined range, the relay node determiner 22 determines the relay node so that a relay node candidate having a higher communication frequency is more likely to be determined as the relay node than a relay node candidate having a lower communication frequency.

The communication frequency of a relay node candidate is determined based on the number of lower nodes of this relay node candidate, for example. More specifically, if the number of lower nodes of each relay node candidate is within a predetermined range, a relay node candidate having more lower nodes is more likely to be determined as the relay node than a relay node candidate having fewer lower nodes. If the number of lower nodes of each relay node candidate is within the predetermined range, a relay node candidate having more lower nodes has a higher communication frequency than a relay node candidate having fewer lower nodes and is thus more likely to be determined as the relay node. The relay node determiner 22 may determine the relay node by using information other than the communication frequency. For example, the relay node determiner 22 may determine the relay node, based on the communication cost (third cost), which will be discussed later.

When the relay node is determined by the relay node determiner 22, the path information generator 23, which will be discussed below, generates path information of the node 1 based on the determination made by the relay node determiner 22.

(2-2-3) Path Information Generator 23

When the relay node is determined by the relay node determiner 22, the path information generator 23 generates path information of the node 1. The path information generated by the path information generator 23 is stored in the node table 31 of the storage unit 30, which will be discussed later. The generated path information is also sent to the master node via the relay node. This allows the master node and the relay node positioned between the node 1 and the master node to obtain the path information of the node 1.

(2-2-4) Cost Adjuster 24

When the path information receiver 13 has received path information indicating that the node 1 is a relay node from another node, the cost adjuster 24 adjusts the third cost, which is the communication cost from the node 1 to the master node.

More specifically, the cost adjuster 24 multiplies the third cost by a predetermined weighting factor, based on the number of lower nodes of the node 1, thereby adjusting the third cost. The weighting factor is a factor that increases the possibility that a node having more lower nodes will be determined as the relay node than a node having fewer lower nodes when the number of lower nodes of the node 1 is within a predetermined range. In a specific example, the weighting factor is calculated by the following equation (1), In equation (1), the number of lower nodes of the node 1 is substituted into x.

$$y=0.01x^2-0.2x+1 \qquad (1)$$

The number of lower nodes of the node is determined based on the number of items of path information of lower nodes received by the path information receiver 13.

The third cost adjusted by the cost adjuster 24 is stored in the node table 31.

An explanation will be given of a case in which path information is generated by each of the node 1A and the node 1B in the communication system 100 shown in FIG. 3. It is assumed that, in the communication system 100, the communication path between the node 1X and each of the node 1A and the node 1B is not yet established.

A description will first be given of a case in which the communication path between the node 1A and the node 1M is established and path information is generated. The third cost of the node 1A (communication cost between the node 1A and the node 1M) is 6, as shown in FIG. 3. The lower nodes of the node 1A are the node 1C and the node 1Y, and the number of lower nodes of the node 1A is two. 2 is thus substituted into x in the above-described equation (1), and the weighting factor is calculated as 0.64. As a result of multiplying the third cost by the weighting factor, the adjusted third cost of the node 1A results in 3.84.

A description will now be given of case in which the communication path between the node 1B and the node 1M is established and path information is generated. The third cost of the node 1B (communication cost between the node 1B and the node 1M) is 2, as shown in FIG. 3. The number of lower nodes of the node 1B is 0. 0 is thus substituted into x in the above-described equation (1), and the weighting factor is calculated as 1. As a result of multiplying the third cost by the weighting factor, the adjusted third cost of the node 1B results in 2.

(2-3) Storage Unit 30

The storage unit 30 stores various items of information to be used by the node 1 to determine the relay node. For example, the storage unit 30 of the node 1 stores node information of the node 1, information about the communication frequency which is required when the node 1 is a relay node candidate, and information about the priority to be used when the node 1 is a relay node candidate.

The node information of the node 1 at least includes identification information of the node 1, system identification information of the system to which the node 1 belongs, and type information of the node 1. The identification information of the node 1 is preset information for identifying each of the plural nodes. The system identification information of the node 1 is preset information for identifying the system to which the node 1 belongs. Each system includes one or plural nodes. The type information of the node 1 is information indicating information about the type, such as whether the node 1 is a master node and whether the node 1 is a parent node.

The information about the communication frequency which is required when the node 1 is a relay node candidate is a communication frequency actual value or a communication frequency estimated value of the node 1. The communication frequency actual value or the communication frequency estimated value may be calculated based on the number of lower nodes of a relay node candidate, the signal transmission frequency of the relay node candidate, or a predetermined existing method, for example.

The information about the priority to be used when the node 1 is a relay node candidate is information determined based on the node information, the information about the communication frequency, or the third cost, for example, and is information concerning the priority regarding whether the node 1 is determined as a relay node.

The storage unit 30 also includes a node table 31 storing information about the node 1 and a neighbor node table 32 storing information about a neighbor node of the node 1. If the node 1 has plural neighbor nodes, the neighbor node table 32 is created for each of the neighbor nodes. For example, a node table 31x and neighbor node tables 32x of the node 1X in the communication system 100 are those shown in FIG. 4.

In the node table 31 of the node 1, items of information, such as path information of the node 1 and the communication cost from the node 1 to the master node (third cost), are stored.

In the neighbor node table 32 of the node 1, items of information, such as path information of a neighbor node of the node 1, the communication cost from the neighbor node to the node 1 (first cost), the communication cost from the neighbor node to the master node (second cost), and the communication cost from the node 1 to the master node (third cost), are stored. The communication cost from the neighbor node to the master node (second cost) is information of the third cost of the neighbor node anal is a value adjusted by the cost adjuster of this neighbor node.

Information other than the above-described items of information may be stored in the node table and the neighbor node tables.

Figure 5:
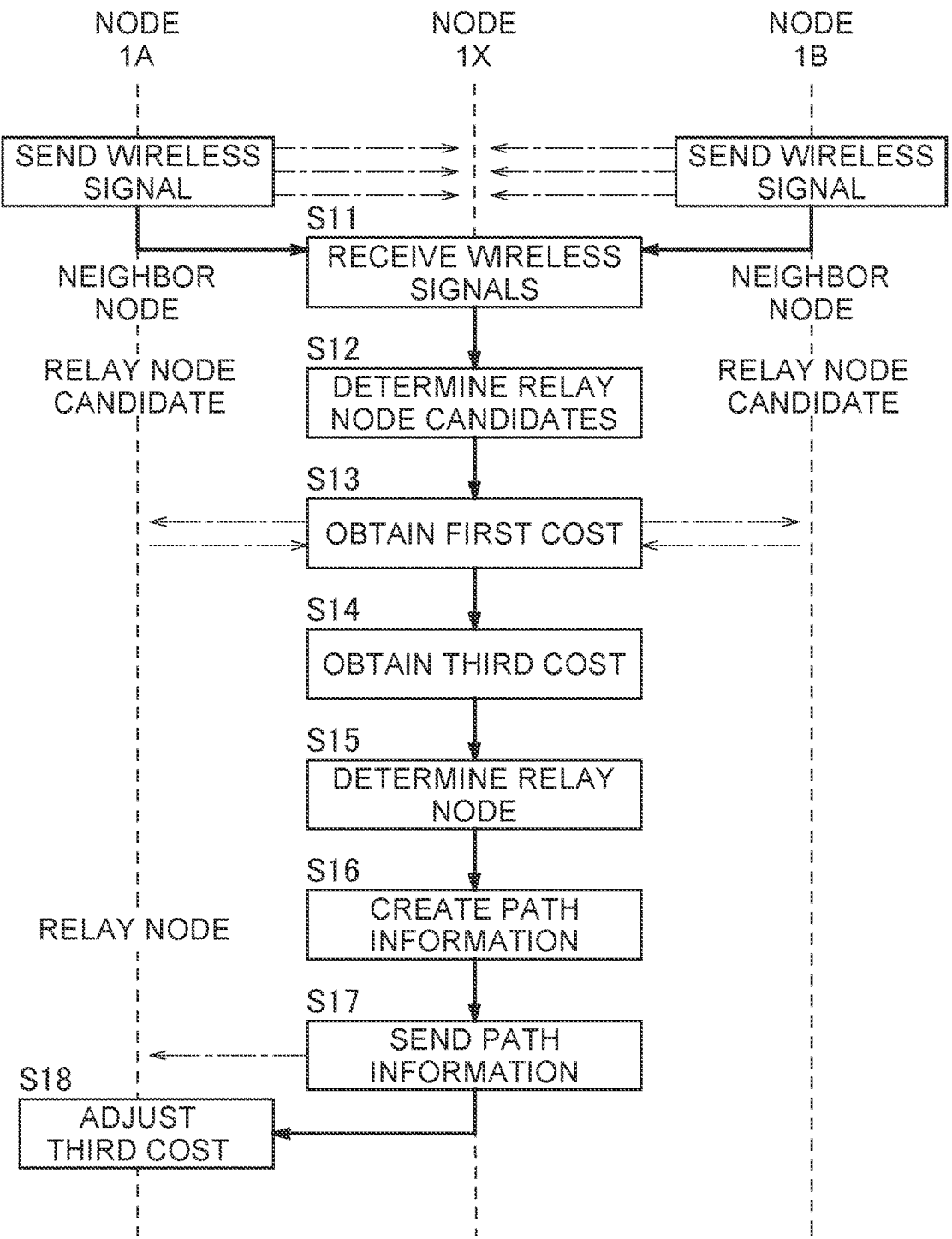
FIG. 5 is a flowchart illustrating a processing method for establishing a communication path and generating path information.

(3) Processing for Establishing Communication Path with Neighbor Node by Node 1X An explanation will be given, with reference to FIGS. 3 and 5, of processing for establishing a communication path with a neighbor node by the node 1X in the communication system 100 of the present disclosure, FIG. 5 is a flowchart illustrating a processing method in the communication system 100. It is assumed that the node 1A and the node 1B are present as the neighbor nodes of the node 1X and communication paths other than that between the node 1X and the node 1A and that between the node 1X and the node 1B have already been established.

In step S11, the communication unit 10x of the node 1X receives a wireless signal sent from the node 1A and that from the node 1B. The node 1A has path information of the path from the node 1A to the node 1M, while the node 1B has path information of the path from the node 1B to the node 1M, and the node 1A and the node 1B each broadcast a wireless signal at predetermined time intervals. The wireless signal sent from the node 1A includes path information of the path from the node 1A to the node 1M and also includes information about the communication cost from the node 1A to the node 1M (third cost). The wireless signal sent from the node 1B includes path information of the path from the node 1B to the node 1M and also includes information about the communication cost from the node 1B to the node 1M (third cost). The third cost of the node 1A and that of the node 1B may be the communication cost adjusted by the above-described cost adjusters 24 (24a and 24b). Upon receiving the wireless signals, the node 1X recognizes that the node 1A and 1B are present as neighbor nodes of the node 1X.

In step S12, the relay node candidate determiner 21x of the node 1X determines the node 1A and the node 1B as relay node candidates and creates neighbor node tables 32x. The neighbor node table 32x is created for each of the node 1A and the node 1B, as shown in FIG. 4.

Figure 4:
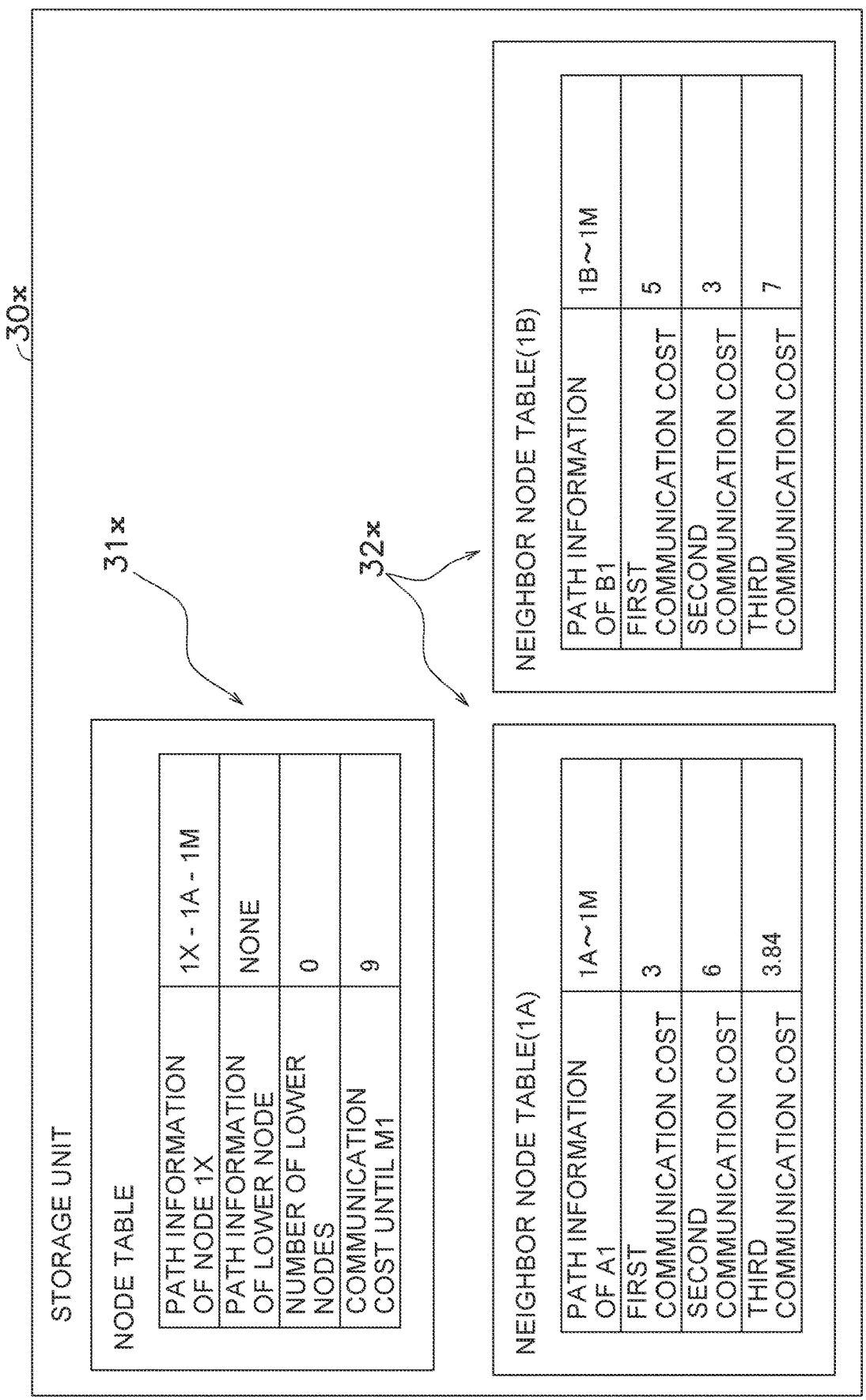
FIG. 4 is a diagram illustrating examples of a node table and a neighbor node table.

As shown in FIG. 4, in the neighbor node table 32x for the node 1A, path information of the node 1A and the communication cost from the node 1A to the node 1M (third cost of the node 1A) are stored, based on the information received in step S11. The communication cost from the node 1A to the node 1M (third cost of the node 1A) is stored as the second cost of the node 1X.

Likewise, the information of the node 1B received in step S11 is also stored in the neighbor node table 32x for the node 1B.

In step S13, the cost information communicators 11x and 12x of the node 1X exchange wireless signals with each of the node 1A and the node 1B so as to obtain the first cost of the node 1A and that of the node 1B. The first cost of the node 1A and that of the node 1B obtained by the cost information communicators 11x and 12x are each stored in a region of the neighbor node table 32x where the first cost is stored.

In step S14, the node 1X calculates the third cost based on the first cost and the second cost of the node 1A stored in the neighbor node table 32x and calculates the third cost based on the first cost and the second cost of the node 1B stored in the neighbor node table 32x and stores the third cost of the node A and that of the node B in the neighbor node tables 32x.

In step S15, the relay node determiner 22x of the node 1X determines the relay node based on the third cost of the node 1A and that of the node 1B stored in the neighbor node tables. The relay node determiner 22x determines the relay node candidate having the smallest third cost as the relay node. In this example, the relay node determiner 22x determines the node 1A as the relay node of the node 1X.

In step S16, the path information generator 23x of the node 1X creates path information of the node 1X based on the determination of the relay node determiner 22x made in step S15. The path information created by the path information generator 23x is stored in the node table 31x of the storage unit 30x.

In step S17, the path information of the node 1X created in step S16 is sent to the node 1M via the node 1A. This allows the node 1A and the node 1M to obtain the path information of the node 1X.

When the node 1A has obtained the path information of the node 1X in step S17, the cost adjuster 24a of the node 1A adjusts the third cost of the node 1A in step S18. The cost adjuster 24a adjusts the third cost by multiplying the third cost of the node 1A by the predetermined weighting factor, as described above. In the present embodiment, the weighting factor is calculated by substituting the number of lower nodes of the node 1A into equation (1). The third cost adjusted by the cost adjuster 24a of the node 1A is stored in the node table 31a as the communication cost from the node 1A to the node 1M (third cost). The number of lower nodes stored in the node table 31a is updated to 1.

Then, processing for establishing a communication path with a neighbor node by the node 1X has been completed, and the communication path between the node 1X and the node 1A is established.

Figure 6:
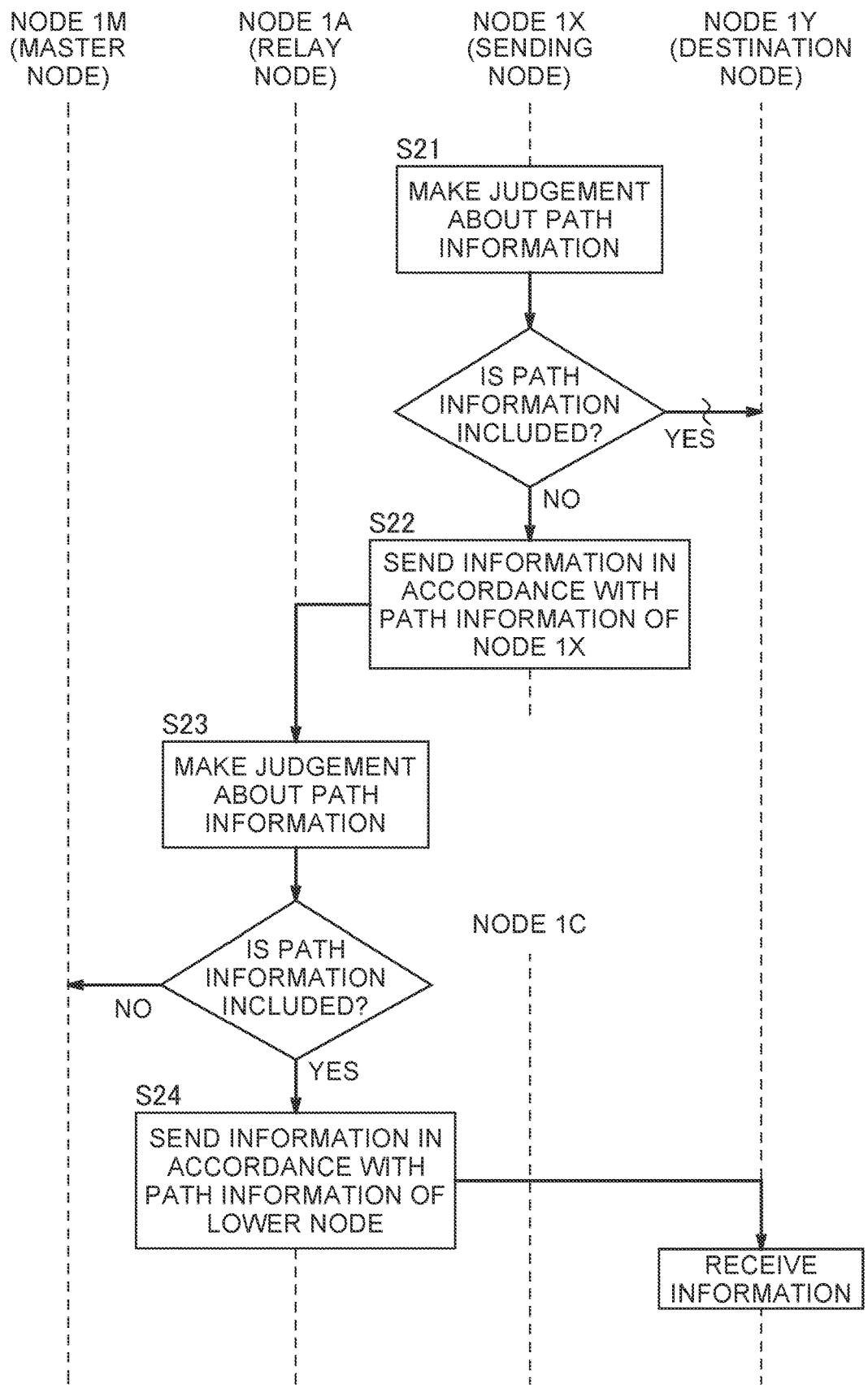
FIG. 6 is a flowchart illustrating a communication processing method.

(4) Communication Processing for Sending Information Based on Path Information A description will now be given of processing for sending information from the node 1X to the node 1Y by using the path information of the path of the node 1X established in steps S11 through S16 described above. FIG. 6 is a flowchart illustrating an example of processing for sending information based on path information.

First, in step S21, the node 1X judges whether information of the communication path until the node 1Y is included in path information of the node 1X or path information of the lower nodes stored in the storage unit 30x.

If the result of the judgement in step S21 indicates that information of the communication path until the node 1Y is not included in the path information stored in the storage unit 30x of the node 1X, in step S22, the node 1X sends information to the node 1A in accordance with the path information of the node 1X generated in step S16. The communication cost from the node 1X to the node 1A is 3.

If the result of the judgement in step S21 indicates that information of the communication path until the node 1Y is included in the path information stored in the storage unit 30x of the node 1X, the node 1X sends information to the node 1Y in accordance with the path information.

Then, in step S23, upon receiving the information, the node 1A judges whether information of the communication path until the node 1Y is included in path information of the node 1A or path information of a lower node stored in the storage unit 30a.

Since the path until the node 1Y is included in the path information stored in the node 1A, in step S24, the node 1A sends the information to the node 1Y via the node 1C in accordance with the path information of the path until the node 1Y. The communication cost from the node 1A to the node 1C is 3, and the communication cost from the node 1C to the node 1Y is 3.

Then, communication processing for sending information from the node 1X to the node 1Y has been completed. The communication cost required for this communication processing is 9.

(5) Characteristics

5-1

A node 1 according to the present disclosure is a node 1 that performs multi-hop communication. A communication system according to the present disclosure is a communication system that performs multi-hop communication and includes the node 1 of the present disclosure. The node 1 includes a relay node determiner 22. The relay node determiner 22 determines a relay node that performs relaying, from among relay node candidates. The relay node candidates have path information of a path to a master node. At least when the number of lower nodes of each of the relay node candidates is within a predetermined range, the relay node determiner 22 determines the relay node so that a relay node candidate having a larger number of lower nodes is more likely to be determined as the relay node than a relay node candidate having a smaller number of lower nodes.

The node 1 according to the present disclosure further includes a cost information receiver 11 and a cost information sender 12, which serve as cost obtainers, that obtain a first cost, a second cost, and a third cost. The first cost is a cost from a node to a relay node candidate. The second cost is a cost which is adjusted based on the number of lower nodes of a relay node candidate. The second cost is a cost from a relay node candidate to the master node. The third cost is a cost from the node to the master node and is determined based on the first cost and the second cost. The relay node determiner 22 determines the relay node based on the third cost.

The second cost is a cost adjusted by multiplying a cost which is from a relay node candidate to the master node and which is stored in a relay node candidate by a predetermined weighting factor. When the number of lower nodes of a relay node candidate is within a predetermined range, the weighting factor serves as a factor that decreases the second cost.

The node 1 according to the present disclosure has the above-described characteristics and selects the relay node by using the weighting factor based on the number of lower nodes. With this arrangement, the node 1 is able to determine the relay node so that a relay node candidate having a larger number of lower nodes is more likely to be determined as the relay node than a relay node candidate having a smaller number of lower nodes. The node 1 can thus contribute to decreasing the number of nodes that perform relaying to a destination node. It is thus possible to reduce the communication cost required for completing communication processing in the communication system 100 which includes the node 1.

5-2

The node 1 according to the present disclosure further includes a path information generator 23, a path information receiver 13, and a path information sender 14. The path information generator 23 generates path information of a path from the node 1 to the master node via a relay node. The path information receiver 13 receives, from a lower node of the node 1, path information of a path from the lower node to the master node. The path information sender 14 sends the path information generated by the path information generator 23 and the path information received by the path information receiver 13 to the relay node. The number of lower nodes of a relay node candidate is determined based on the number of items of path information received by this relay node candidate.

This enables the node 1 to determine the number of lower nodes of each of the relay node candidates and to select the relay node based on the number of lower nodes.

5-3

If the number of lower nodes of a relay node candidate is not within the predetermined range, the relay node determiner 22 of the node 1 of the present disclosure determines the relay node so that this relay node candidate is less likely to be determined as the relay node.

The cost adjuster 24 of the node 1 of the present disclosure adjusts the second cost by using the weighing factor based on equation (1). Equation (1) is a function that calculates the weighting factor so that the weighting factor decreases the second cost when the number of lower nodes of a relay node candidate is within the predetermined range. Equation (1) is also a function that calculates the weighting factor so that the weighting factor increases the second cost when the number of lower nodes of a relay node candidate is not within the predetermined range. The relay node determiner 22 determines the relay node by using the third cost which is calculated based on the second cost adjusted by the cost adjuster 24.

When the number of lower nodes of a relay node candidate is not within the predetermined range, the node 1 determines the relay node so that this relay node candidate is less likely to be determined as the relay node. This can contribute to reducing the concentration of a load on a specific relay node candidate.

5-4

A communication method according to the present disclosure is a communication method for the communication system 100 that performs multi-hop communication. The communication method includes a relay node determining step S15. The relay node determining step S15 determines a relay node that performs relaying, from among relay node candidates having path information of a path to a master node. At least when the number of lower nodes of each of the relay node candidates is within a predetermined range, the relay node determining step S15 determines the relay node so that a relay node candidate having a larger number of lower nodes is more likely to be determined as the relay node than a relay node candidate having a smaller number of lower nodes.

By executing communication processing by using the above-described node 1, the communication system 100 implements the above-described communication method. This method enables the node 1 to determine the relay node so that a relay node candidate having a larger number of lower nodes is more likely to be determined as the relay node than a relay node candidate having a smaller number of lower nodes. The node 1 can thus contribute to decreasing the number of nodes that perform relaying to a destination node. It is thus possible to reduce the communication cost required for completing communication processing in the communication system 100 which includes the node 1.

(6) Modified Examples 6-1

If plural relay node candidates having the same third cost are found, the relay node determiner 22 of the node 1 of the present disclosure may determine the relay node candidate having the smallest second cost as the relay node.

If there are plural relay node candidates having the same third cost, the relay node candidate having a smaller second cost performs relaying. This can contribute to reducing the number of nodes that perform relaying to a destination node, thereby achieving efficient communication.

6-2

If the communication frequency of a relay node candidate is higher than or equal to a predetermined threshold, the relay node determiner 22 of the node 1 of the present disclosure determines the relay node so that this relay node candidate is less likely to be determined as the relay node.

More specifically, if the communication frequency of a relay node candidate is higher than or equal to the predetermined threshold, the node 1 according to the present disclosure may use a predetermined weighting factor to determine the relay node so that this relay node candidate is less likely to be determined as the relay node.

The node 1 can thus contribute to reducing the concentration of a load on a specific relay node candidate.

6-3

For the sake of description, all nodes included in the communication system 100 according to the present disclosure are nodes 1. However, some of the nodes included in the communication system 100 may be nodes having different characteristics from the node 1. For example, some of the nodes included in the communication system 100 may be nodes 2.

6-4

The communication system 100 according to the present disclosure is a communication system that performs multi-hop communication. However, the communication system 100 may also include a communication method other than multi-hop communication. For example, the node 1 may include communication means using a wired medium, such as power line communication.

6-5

In the above-described processing for establishing a communication path, the relay node determiner 22 determines the relay node based on the communication cost (third cost). Alternatively, at least when the communication frequency estimated values of the relay node candidates are within a predetermined range, the relay node determiner 22 may determine the relay node so that a relay node candidate having a higher communication frequency estimated value is more likely to be determined as the relay node than a relay node candidate having a lower communication frequency estimated value. Alternatively, at least when the communication frequency actual values of the relay node candidates are within a predetermined range, the relay node determiner 22 may determine the relay node so that a relay node candidate having a higher communication frequency actual value is more likely to be determined as the relay node than a relay node candidate having a lower communication frequency actual value.

When the communication frequency estimated value or the communication frequency actual value of a relay node candidate is not within the predetermined range, the processor 20 may execute adjusting processing by multiplying the communication frequency estimated value or the communication frequency actual value by a predetermined weighting factor so that this relay node candidate is less likely to be determined as the relay node. This can contribute to reducing the concentration of a load on a specific relay node candidate.

6-6

The node 1 according to the present disclosure has information concerning the priority for determining a relay node candidate as the relay node.

The information concerning the priority is information determined based on node information, information about the communication frequency, or the third cost, for example. The relay node determiner 22 may determine the relay node based on the information concerning the priority.

For example, it is possible to set the priority of the master node to be the highest priority. Additionally, if a node different from the node 1 belongs to the same system as the node 1, if identification information of this different node indicates that the different node is a parent node of the node 1, and if the different node is included in the relay node candidates, the relay node determiner 22 may set the priority of this different node to be a higher priority.

Setting the priority in this manner enables the relay node determiner 22 to determine a relay node candidate as the relay node based on the priority.

7

The embodiment of the present disclosure has been described above. It is to be understood that various changes may be made to modes and details of the embodiment without departing from the spirit and scope of the present disclosure defined by the following claims.

The invention claimed is:

1. A node that performs multi-hop communication, the node comprising:
   a relay node determiner configured to determine a relay node from a plurality of relay node candidates having path information of a path to a master node, the relay node being configured to perform relaying,
   at least when a number of lower nodes of each of the relay node candidates is within a predetermined range, the relay node determiner being configured to determine the relay node so that a relay node candidate having a larger number of lower nodes is more likely to be determined as the relay node than a relay node candidate having a smaller number of lower nodes.

2. The node according to claim 1, further comprising:
   cost obtainers configured to obtain a first cost, a second cost, and a third cost,
   the first cost being a cost from the node to each of the relay node candidates,
   the second cost being a cost from each of the relay node candidates to the master node, the second cost being adjusted based on the number of lower nodes of each of the relay node candidates,
   the third cost being a cost from the node to the master node, the third cost being determined based on the first cost and the second cost, and
   the relay node determiner being configured to determine the relay node based on the third cost.

3. The node according to claim 2, wherein
   the second cost is a cost obtained by multiplying a value by a predetermined weighting factor, the value being a cost from each of the relay node candidates to the master node and being stored in a corresponding one of the relay node candidates, and
   when the number of lower nodes of each of the relay node candidates is within a predetermined range, the weighting factor decreases the second cost.

4. The node according to claim 2, wherein
   if a plurality of the relay node candidates having third costs that are the same are found, the relay node determiner is configured to determine the relay node candidate having the smallest second cost as the relay node.

5. The node according to claim 1, further comprising:
   a path information generator configured to generate the path information of a path from the node to the master node via the relay node;
   a path information receiver configured to receive, from a lower node of the node, the path information of a path from the lower node to the master node; and
   a path information sender configured to send the path information generated by the path information generator and the path information received by the path information receiver to the relay node,
   the number of lower nodes of each of the relay node candidates being determined based on a number of items of the path information received by a corresponding one of the relay node candidates.

6. The node according to claim 1, wherein
   if the number of lower nodes of the relay node candidate is not within the predetermined range, the relay node determiner is configured to determine the relay node so that the relay node candidate is less likely to be determined as the relay node.

7. A communication system including the node according to claim 1, the communication system being configured to perform multi-hop communication.

8. A node that performs multi-hop communication, the node comprising:
   a relay node determiner configured to determine a relay node from a plurality of relay node candidates having path information of a path to a master node, the relay node being configured to perform relaying,
   at least when communication frequencies of the relay node candidates are within a predetermined range, the relay node determiner being configured to determine the relay node so that a relay node candidate with a higher communication frequency is more likely to be determined as the relay node than a relay node candidate with a lower communication frequency,
   the communication frequency being determined based on a communication frequency estimated value of the relay node candidate, and
   at least when the communication frequency estimated values of the relay node candidates are within a predetermined range, the relay node determiner being configured to determine the relay node so that a relay node candidate having a higher communication frequency estimated value is more likely to be determined as the relay node than a relay node candidate having a lower communication frequency estimated value.

9. The node according to claim 8, wherein
node information is set in the node, and
the node information at least includes identification information of the node, system identification information of a system to which the node belongs, and type information of the node.

10. The node according to claim 8, wherein
the relay node candidates have information concerning a priority usable to determine the relay node candidates as the relay node.

11. The node according to claim 8, wherein
if a different node from the node belongs to the same system as the node, if identification information of the different node indicates that the different node is a parent node of the node, and if the different node is included in the relay node candidates, the relay node determiner is configured to preferentially determine the different node as the relay node.

12. The node according to claim 8, wherein
if a different node from the node belongs to the same system as the node, if identification information of the different node indicates that the different node is a parent node of the node, and if the different node is included in the relay node candidates, the relay node determiner is configured to preferentially determine as the relay node, the relay node candidate other than the master node belonging to the same system and having the highest priority.

13. The node according to claim 8, wherein
if a node belonging to the same system as the node is not included in the relay node candidates, the relay node determiner is configured to determine the relay node based on a priority of the relay node candidates.

14. The node according to claim 8, wherein
the node is an outdoor unit or an indoor unit of an air conditioner.

15. The node according to claim 8, wherein
a communication frequency actual value is determined based on a signal transmission frequency of the relay node candidate.

16. The node according to claim 8, wherein
if the communication frequency of the relay node candidate is higher than or equal to a predetermined threshold, the relay node determiner is configured to determine the relay node so that the relay node candidate is less likely to be determined as the relay node.

17. A communication system including the node according to claim 8, the communication system being configured to perform multi-hop communication.

18. A communication method for a communication system that performs multi-hop communication, the communication method comprising:
determining a relay node from a plurality of relay node candidates having path information of a path to a master node, the relay node being configured to perform relaying,
at least when a number of lower nodes of each of the relay node candidates is within a predetermined range, the relay node being determined so that a relay node candidate having a larger number of lower nodes is more likely to be determined as the relay node than a relay node candidate having a smaller number of lower nodes.

* * * * *